(12) United States Patent
Fukano et al.

(10) Patent No.: US 6,585,226 B2
(45) Date of Patent: Jul. 1, 2003

(54) TWO-WAY VALVE

(75) Inventors: Yoshihiro Fukano, Ibaraki-ken (JP);
Tadashi Uchino, Ibaraki-ken (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/985,653

(22) Filed: Nov. 5, 2001

(65) Prior Publication Data
US 2002/0053651 A1 May 9, 2002

(30) Foreign Application Priority Data
Nov. 6, 2000 (JP) ........................................ 2000-337760

(51) Int. Cl.[7] ................................................ F16K 7/17
(52) U.S. Cl. ........................................ 251/28; 251/331
(58) Field of Search ............................. 251/12–30.05, 251/318–334

(56) References Cited

U.S. PATENT DOCUMENTS

| | | | |
|---|---|---|---|
| 3,451,423 A | 6/1969 | Priese | |
| 4,699,352 A | * 10/1987 | Mumby | 251/30.03 |
| 5,131,627 A | 7/1992 | Kolene | 251/331 |
| 5,224,683 A | * 7/1993 | Richerson | 251/30.01 |
| 5,390,895 A | 2/1995 | Iwabuchi | |
| 5,615,710 A | * 4/1997 | Sato | 251/29 |
| 5,950,924 A | * 9/1999 | Hatakeyama | 251/331 |
| 5,996,636 A | 12/1999 | Fukano et al. | 138/109 |

FOREIGN PATENT DOCUMENTS

JP      8-170755      7/1996

* cited by examiner

Primary Examiner—Paul J. Hirsch
(74) Attorney, Agent, or Firm—Paul A. Guss

(57) ABSTRACT

A first displacement mechanism disposed on the axially lower side includes a first piston, a piston rod displaceable integrally with the first piston, and a diaphragm connected to the piston rod. A second displacement mechanism disposed on the axially upper side includes a second piston for moving the piston rod to slide along a through-hole. A displacement amount of the first piston and a displacement amount of the second piston are different.

12 Claims, 5 Drawing Sheets

TWO-WAY VALVE

BACKGROUND OF THE INVENTION

1. Field of the Invention

The present invention relates to a two-way valve having a first port and a second port for introducing or discharging a pressure fluid in two directions.

2. Description of the Related Art

A two-way valve has been conventionally used for a fluid pressure circuit or the like. A conventional two-way valve of the above type is shown in FIG. 5 (see, for example, U.S. Pat. No. 5,131,627). The two-way valve 1 has a first port 2 and a second port 3 for introducing or discharging a pressure fluid. A piston 5 is displaceable under the action of a pilot pressure supplied via a pilot port 4. A communicating passage 7 providing communication between the first port 2 and the second port 3 is opened or closed by a diaphragm (valve plug) 6 operated integrally with the piston 5.

According to the conventional two-way valve 1, however, the flow rate of the pressure fluid discharged from the second port 3 via the communicating passage 7 is previously fixed by the valve opening degree of the diaphragm 6 to function as the valve plug, i.e., the displacement amount of the piston 5 displaceable under the action of the pilot pressure. The flow rate of the pressure fluid discharged from the second port cannot be changed at multiple stages in the two-way valve 1.

If a certain fluid is charged into an unillustrated vessel, the pressure fluid is charged at a large flow rate per unit time at the initial stage. Then, the pressure fluid is charged into the vessel at a predetermined flow rate after the flow rate of the pressure fluid is changed to a minute flow rate per unit time at the intermediate stage or at the final stage. Then, it is impossible for the conventional two-way valve to freely change the flow rate of the pressure fluid charged within unit time because the flow rate of the pressure fluid charged within unit time is fixed to a constant value.

It is assumed that a flow rate control valve (not shown) for controlling the flow rate of the pressure fluid charged into the vessel is disposed between the vessel and the conventional two-way valve. However, it is necessary to use a member such as the flow rate control valve in addition to the two-way valve. The tubing operation of the above system is complicated and the cost of purchasing the flow rate control valve is increased.

SUMMARY OF THE INVENTION

It is a general object of the present invention to provide a two-way valve which makes it possible to change a flow rate of a pressure fluid to be discharged within unit time at multiple stages by using a simple structure.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
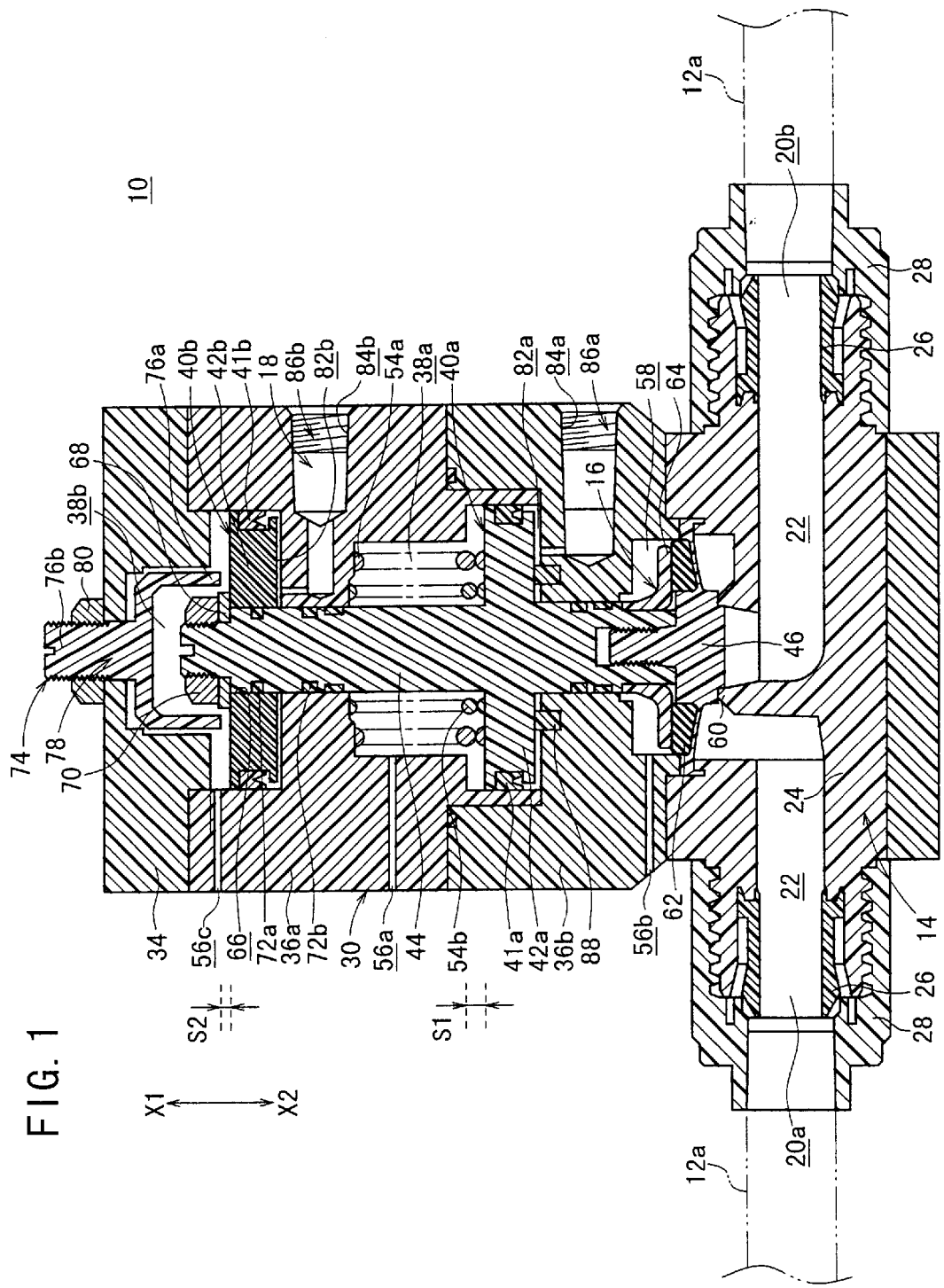
FIG. 1 is a longitudinal sectional view illustrating an arrangement of a two-way valve according to an embodiment of the present invention.

With reference to FIG. 1, reference numeral 10 indicates a two-way valve according to an embodiment of the present invention.

The two-way valve 10 basically comprises a joint section 14 having a pair of tubes 12a, 12b detachably connected thereto, a valve mechanism section 16 disposed on an upper side of the joint section 14, and a pilot pressure supply section 18. A pilot pressure for operating the valve mechanism section 16 is supplied to the pilot pressure supply section 18.

The joint section 14, the valve mechanism section 16, and the pilot pressure supply section 18 are integrally assembled.

The joint section 14 includes a body 24, inner members 26 and lock nuts 28. The body 24 has a first port 20a at an end of the body 14 and a second port 20b at another end thereof. Further, the body 24 has a fluid passage 22 for providing communication between the first port 20a and the second port 20b. The inner members 26 engage with the first port 20a and the second port 20b and are inserted into openings of the tubes 12a, 12b. The lock nuts 28 are screwed on threaded grooves formed at ends of the body 24 to thereby keep connecting portions of the tubes 12a, 12b airtight or liquid-tight.

The joint section 14 is not sealed at portions in which it intersects the axis. The joint section 14 is sealed at only portions in which it is substantially in parallel to the axis. Reference may be made to U.S. Pat. No. 5,996,636 proposed and filed by the present applicant for details of the joint section 14.

A bonnet 30 is connected to an upper portion of the body 24. The bonnet 30 comprises a cover member 34, a first block member 36a, and a second block member 36b which are integrally connected to one another by unillustrated bolts.

The valve mechanism section 16 includes a first displacement mechanism 40a and a second displacement mechanism 40b. The first and second displacement mechanisms 40a, 40b are displaceable in the direction of an arrow X1 or X2 along a first chamber 38a and a second chamber 38b individually formed in the bonnet 30 to thereby open or close the fluid passage 22.

The first displacement mechanism 40a disposed on the axially lower side has a first piston 42a, a piston rod 44 integral with the first piston 42a, and a diaphragm 46 connected to the lower end of the piston rod 44 and displaceable integrally with the first piston 42a. The first piston 42a is installed with a first V-shaped packing 41a at the outer circumferential surface via an annular groove. A displacement amount (stroke amount) of the first piston 42a is set to be S1.

The first chamber 38a is formed between the first piston 42a and the first block member 36a. A pair of spring members 54a, 54b are disposed in the first chamber 38a. Ends of the spring members 54a, 54b are fastened to the upper surface of the first piston 42a and the other ends thereof are fastened to an annular recess of the first block member 36a. The first and second displacement mechanisms 40a, 40b are downwardly urged as a whole (in the direction of the arrow X2) under the resilient action of the spring members 54a, 54b. The respective spring members 54a, 54b has a dual annular structure in which wound diameters thereof are different from each other.

The first block member 36a has a first respiration port 56a for making the first chamber 38a externally (aerially) communicated through a communicating passage, the first chamber 38a being disposed on the upper side of the first piston 42a. The air in the first chamber 38a is externally supplied and discharged by the first respiration port 56a.

A diaphragm chamber 58 closed by the diaphragm 46 is formed on the lower end of the piston rod 44. The diaphragm chamber 58 can externally (aerially) communicate through a second respiration port 56b.

The diaphragm 46 is connected to the lower end of the first piston 42a by the piston rod 44 and is displaceable integrally with the first piston 42a. The diaphragm 46 spaces from a seat section 60 formed on the body 24 or is seated on the seat section 60 to thereby function as a valve plug for opening or closing the fluid passage 22. The pressure fluid (or fluid) flowing through the fluid passage 22 is smoothly switched to be supplied or not to be supplied under the opening or closing action of the diaphragm 46.

A protecting member 62 of a ring shape is disposed on the upper surface of the diaphragm 46. The protecting member 62 is formed of an elastic material or the like such as rubber and protects the thin-walled portion of the diaphragm 46. The protecting member 62 is held by a bent holding member 64 connected to the lower end of the piston rod 44.

The second displacement mechanism 40b disposed on the axially upper side includes a second piston 42b, a fastening ring 68 and a nut member 70. The second piston 42b has a second V-shaped packing 41b installed to the outer circumferential surface thereof via an annular groove and makes the upper portion of the piston rod 44 slidable along a through-hole 66. The fastening ring 68 fastens an end of the second piston 42b. The nut member 70 is screwed on an upper end of the piston rod 44 and fixes the fastening ring 68. The piston rod 44 has a first seal member 72a and a second seal member 72b which are installed thereto. The first seal member 72a contacts the inner circumferential surface of the through-hole 66 of the second piston 42b to effect the sealing function. The second seal member 72b contacts the hole of the first block member 36a to effect the sealing function.

Figure 2:
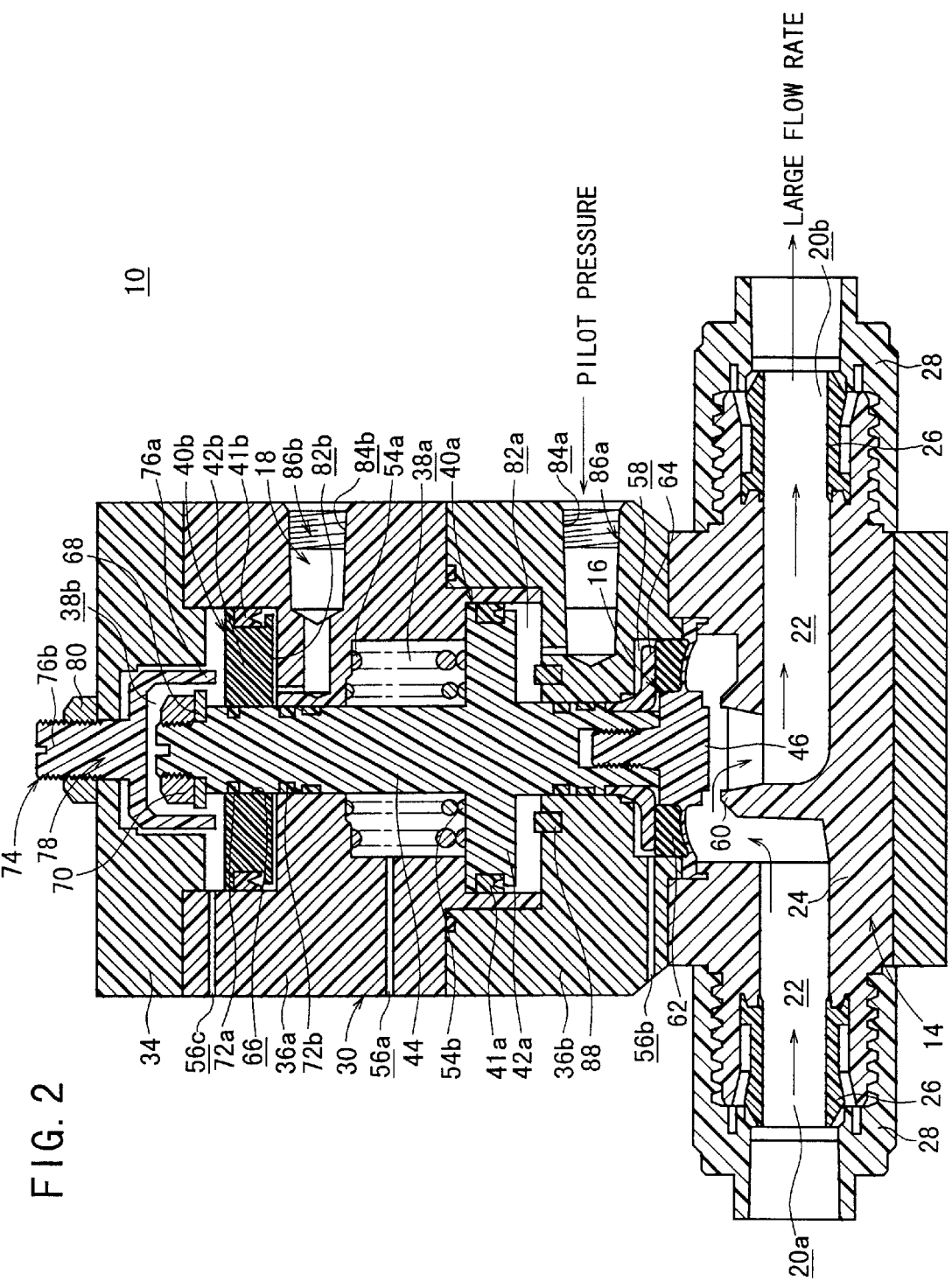
FIG. 2 is a longitudinal sectional view illustrating a state of arrangement in which a pilot pressure is supplied from a first pilot port at the initial position shown in FIG. 1 to displace a first piston.
Figure 3:
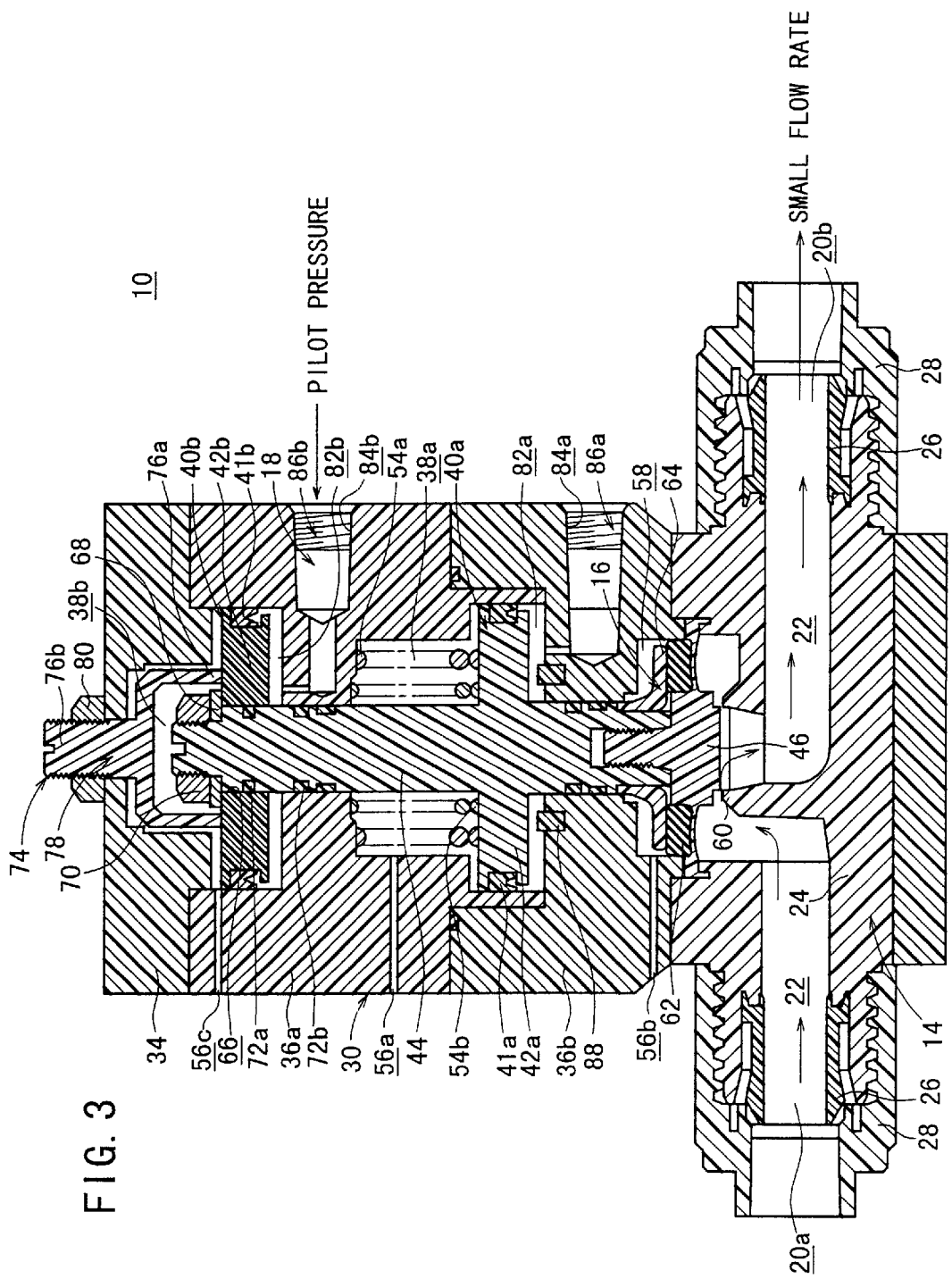
FIG. 3 is a longitudinal sectional view illustrating a state of arrangement in which a pilot pressure is supplied from a second pilot port at the initial position shown in FIG. 1 to displace a second piston.

A displacement amount (stroke amount) of the second piston 42b is set to be S2. Further, the displacement amount S1 of the first piston 42a and the displacement amount S2 of the second piston 42b satisfy the relationship S1>S2. The valve opening degree of the diaphragm 46 corresponding to the displacement amount S1 of the first piston 42a is larger than the valve opening degree thereof corresponding to the displacement amount S2 of the second piston 42b. If the first piston 42a is displaced, the pressure fluid can flow at a large flow rate (see FIG. 2). By contrast, if the second piston 42b is displaced, the pressure fluid can flow at a small flow rate (see FIG. 3). Inversely, the displacement amounts of the first and second pistons 42a, 42b may satisfy the relationship S1<S2.

Then, the second displacement mechanism 40b can slidably displace only the piston rod 44 upwardly along the through-hole 66 without displacing the second piston 42b. If the second piston 42b is pressed under the action of the pilot pressure, the second piston 42b and the piston rod 44 can be integrally displaced upwardly.

The second chamber 38b is formed between the second piston 42b and the cover member 34. The second chamber 38b externally (aerially) communicates through a third respiration port 56c.

The cover member 34 has a flow rate-adjusting mechanism 74 for adjusting the valve opening degree of the diaphragm 46 by regulating the displacement amount of the second piston 42b. The flow rate-adjusting mechanism 74 comprises an adjusting member 78 and a lock nut 80. A screw section 76b and a cup section 76a which makes abutment against the upper surface of the second piston 42b are integrally formed in the adjusting member 78. The lock nut 80 is screwed on the screw section 76b to fix the adjusting member 78 at a desired position.

The pilot pressure supply section 18 comprises a first pilot pressure supply mechanism 86a and a second pilot pressure supply mechanism 86b. The first pilot pressure supply mechanism 86a has a first pilot port 84a communicating with a first pilot chamber 82a formed on the lower side of the first piston 42a. The second pilot pressure supply mechanism 86b has a second pilot port 84b communicating with a second pilot chamber 82b formed on the lower side of the second piston 42b.

If the first piston 42a is pressed upwardly under the action of the pressure fluid supplied to the first pilot chamber 82a via the first pilot port 84a, the first piston 42a and the piston rod 44 are integrally displaced upwardly. However, the second piston 42b is not displaced although only the piston rod 44 is displaced slidably along the through-hole 66.

If the second piston 42b is pressed upwardly under the action of the pressure fluid supplied to the second pilot chamber 82b via the second pilot port 84b, the second piston 42b and the piston rod 44 are integrally displaced upwardly by the fastening ring 68. The first piston 42a integral with the piston rod 44 is displaced therewith.

A buffer member 88 of a ring shape is installed to the first pilot chamber 82a by an annular groove. The buffer member 88 absorbs the shock exerted if the first piston 42a is moved downwardly.

The two-way valve 10 according to the embodiment of the present invention is basically thus constructed. Its operation, function, and effect will now be explained.

An unillustrated fluid supply source is connected to the first port 20a of the two-way valve 10 and an unillustrated fluid-operated apparatus is connected to the second port 20b via the tubes 12a, 12b connected to the first port 20a and the second port 20b. An unillustrated compressed air supply source is connected to the respective first and second pilot ports 84a, 84b via an unillustrated directional control valve. Here, it is assumed that the initial position resides in a state where, as shown in FIG. 1, the first piston 42a and the second piston 42b are in lower limit states and the diaphragm 46 is seated on the seat section 60.

The unillustrated fluid supply source is subsequently energized at the initial position to supply the pilot pressure to the first pilot port 84a under the switching action of the unillustrated directional control valve. The pilot pressure introduced from the first pilot port 84a is supplied to the first pilot chamber 82a. The first piston 42a is moved upwardly by the displacement amount S1 against the resilient force of the spring members 54a, 54b under the action of the pilot pressure.

Therefore, the entire first displacement mechanism 40a including the diaphragm 46 is moved upwardly integrally with the first piston 42a. The diaphragm 46 connected to the first piston 42a by the piston rod 44 is spaced from the seat section 60 by a given distance to thereby open the valve. Then, only the first piston 42a and the piston rod 44 are integrally displaced upwardly. The second piston 42b for moving the piston rod 44 to slide along the through-hole 66 is not displaced (see FIG. 2).

Consequently, the fluid supplied from the unillustrated fluid supply source via the first port 20a flows along the fluid passage 22. Further, the fluid is discharged to the unillustrated fluid-operated apparatus via the second port 20b.

In the above case, the flow rate of the pressure fluid discharged to the unillustrated fluid-operated apparatus from the second port 20b is controlled by the valve opening degree of the diaphragm 46 corresponding to the displacement amount S1 of the first piston 42a. The pressure fluid at a large flow rate per unit time is discharged to the unillustrated fluid-operated apparatus based upon the displacement amount S1 of the first piston 42a, the displacement amount S1 being larger than the displacement amount S2 of the second piston 42b (see FIG. 2).

Next, the pilot pressure ceases to be supplied to the first pilot port 84a under the switching action of the unillustrated directional control valve. Accordingly, the pressure in the first pilot chamber 82a is decreased to move the first piston 42a downwardly under the resilient action of the spring members 54a, 54b. The diaphragm 46 is seated on the seat section 60 to restore to the initial position shown in FIG. 1 in which the valve is closed.

The shock is absorbed by the abutment of the lower surface of the first piston 42a against the buffer member 88 if the first piston 42a is moved downwardly. The vibration can be prevented from occurring, which would be otherwise caused if the diaphragm 46 is seated on the seat section 60.

Next, the pilot pressure is supplied to the second pilot port 84b under the switching action of the unillustrated directional control valve. The pilot pressure introduced from the second pilot port 84b is supplied to the second pilot chamber 82b. The second piston 42b and the piston rod 44 are integrally moved upwardly against the resilient force of the spring members 54a, 54b under the action of the pilot pressure.

Therefore, the entire second displacement mechanism 40b including the diaphragm 46 is moved upwardly integrally with the second piston 42b. The diaphragm 46 connected via the piston rod 44 is spaced from the seat section 60 by a given distance to thereby open the valve. Then, the second piston 42b and the piston rod 44 are integrally moved upwardly by the displacement amount S2 by the fastening ring 68. The first piston 42a integral with the piston rod 44 is displaced therewith (see FIG. 3).

Consequently, the fluid supplied from the unillustrated fluid supply source via the first piston 20a flows along the fluid passage 22. Further, the fluid is discharged to the unillustrated fluid-operated apparatus via the second port 20b.

In the above case, the flow rate of the pressure fluid discharged to the unillustrated fluid-operated apparatus from the second port 20b is controlled by the valve opening degree of the diaphragm 46 corresponding to the displacement amount S2 of the second piston 42b. The pressure fluid at a small flow rate per unit time is discharged to the unillustrated fluid-operated apparatus based on the displacement amount S2 of the second piston 42b, the displacement amount S2 being smaller than the displacement amount S1 of the first piston 42a (see FIG. 3).

If the pilot pressure ceases to be supplied to the second pilot port 84b under the switching action of the unillustrated directional control valve, the second piston 42b is moved downwardly under the resilient action of the spring members 54a, 54b. The diaphragm 46 is seated on the seat section 60 to restore to the initial position in which the valve is closed.

According to the embodiment of the present invention, the first piston 42a and the second piston 42b which have the mutually different displacement amounts (S1, S2) change the valve opening degree of the diaphragm 46 which functions as the valve plug. It is thus possible to control, at the multiple stages, the flow rate of the pressure fluid supplied from the second port 20b to the unillustrated fluid-operated apparatus.

According to the embodiment of the present invention, the valve opening degree of the diaphragm 46 can be freely adjusted by regulating the displacement amount of the second piston 42b by providing the flow rate-adjusting mechanism 74.

According to the embodiment of the present invention, the first piston 42a of the first displacement mechanism 40a and the second piston 42b of the second displacement mechanism 40b are disposed in the bonnet 30 to be displaceable under the action of the pilot pressure supplied through the first pilot port 84a or the second pilot port 84b. With this simple structure, it is possible to control, at the multiple stages, the flow rate of the pressure fluid supplied to the unillustrated fluid-operated apparatus. Therefore, it is not necessary to provide a separate valve of controlling the flow rate and to perform a complicated tubing operation. Accordingly, the production cost can be reduced.

According to the embodiment of the present invention, the second piston 42b corresponding to the small flow rate is operated after the operation of the first piston 42a corresponding to the large flow rate. However, either of them may be operated earlier depending on the flow speed desired by a user. Further, the flow rate of the pressure fluid can naturally be controlled at a higher degree of multiple stages by providing a plurality of unillustrated pistons in addition to the first and second pistons 42a, 42b.

Figure 4:
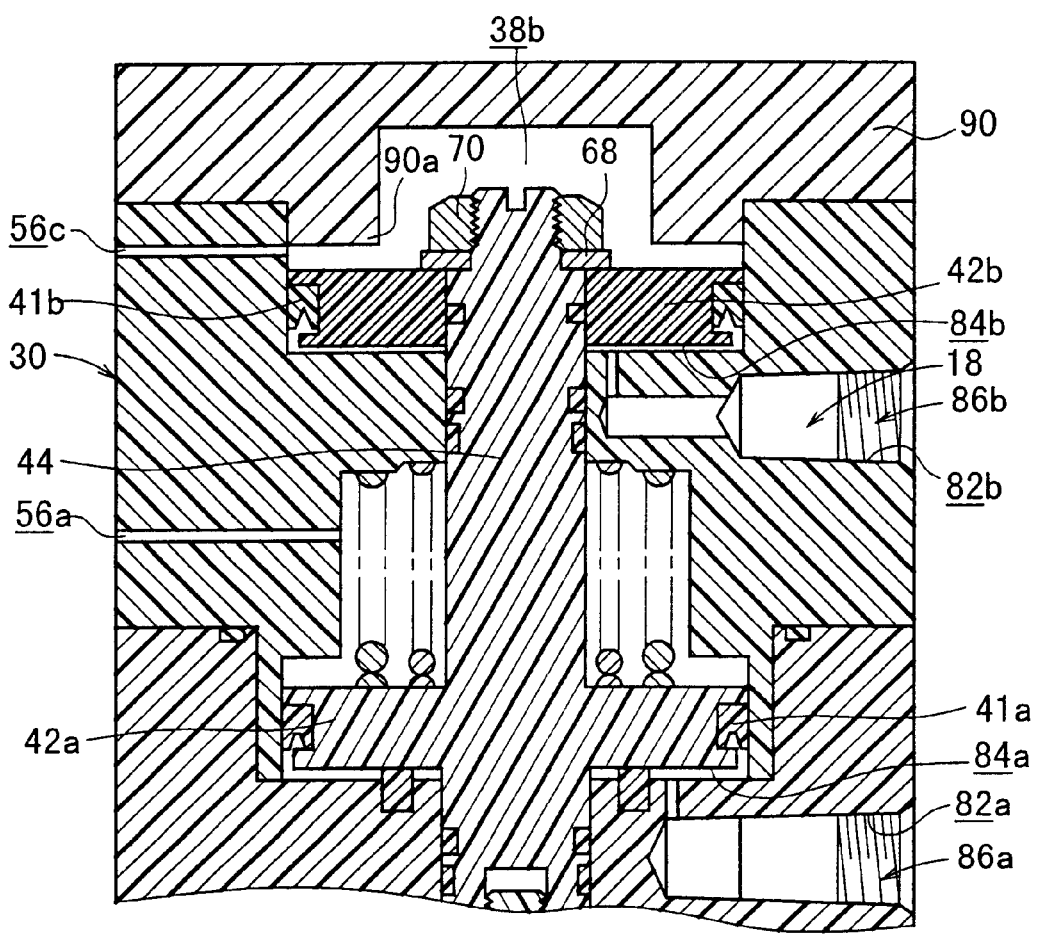
FIG. 4 is, with partial omission, a longitudinal sectional view illustrating a two-way valve according to another embodiment.
Figure 5:
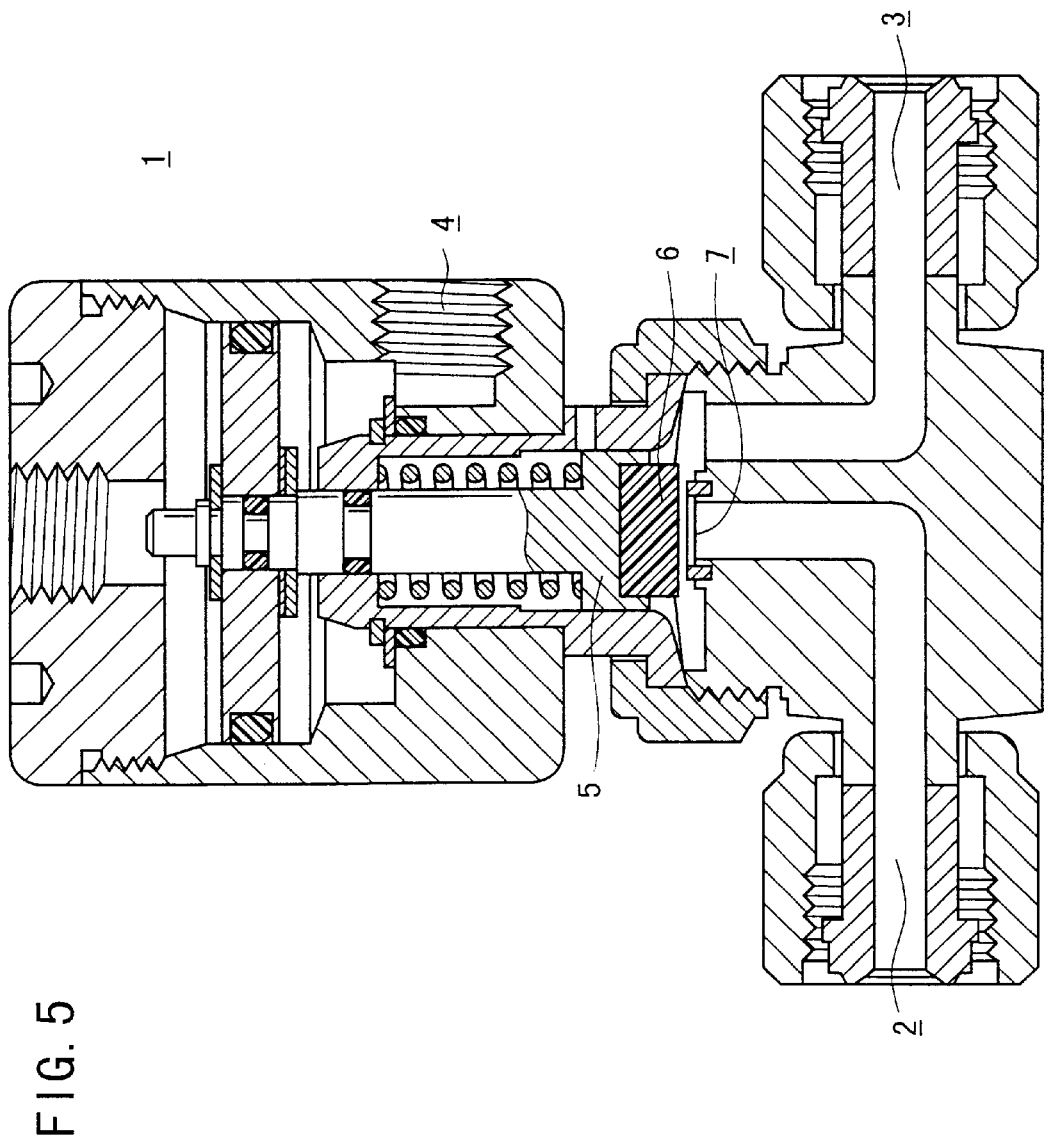
FIG. 5 is a longitudinal sectional view illustrating a conventional two-way valve.

A two-way valve according to another embodiment is shown in FIG. 4.

The two-way valve 10a according to another embodiment is different from the above embodiment in that the displacement amount of the second piston 42b is previously fixed by a projection 90a of a cover member 90 without providing the flow rate-adjusting mechanism 74.

The other function and effect are the same as those of the above embodiment. Detailed explanation thereof is omitted.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A two-way valve comprising:
    a joint section having a first port formed at an end of said joint section and a second port formed at another end thereof, said first and second ports communicating with a fluid passage disposed in said joint section;
    a valve mechanism section having a plurality of displacement mechanisms including a valve plug for opening or closing said fluid passage under the action of a pilot pressure, valve opening degree of said valve plug being variable depending on said plurality of displacement mechanisms; and a pilot pressure supply section having a plurality of pilot pressure supply mechanisms including pilot ports for supplying the pilot pressure.

2. The two-way valve according to claim 1, wherein said displacement mechanisms include a first displacement mechanism having a first piston and a second displacement mechanism having a second pistons, a displacement amount of said first piston and a displacement amount of said second piston being different.

3. The two-way valve according to claim 2, wherein said first and second displacement mechanisms are coaxially disposed.

4. The two-way valve according to claim 1, wherein said displacement mechanisms include a first displacement mechanism and a second displacement mechanism, said first displacement mechanism has a first piston, a piston rod displaceable integrally with said first piston, and a diaphragm connected to said piston rod, and said second displacement mechanism has a second piston for moving said piston rod to slide along a through-hole.

5. The two-way valve according to claim 4, wherein a displacement amount of said first piston and a displacement amount of said second piston are different.

6. The two-way valve according to claim 5, wherein said displacement amount of said first piston is larger than said displacement amount of said second piston.

7. The two-way valve according to claim 5, wherein one of said displacement amounts of said first and second pistons is adjustable.

8. The two-way valve according to claim 5, wherein said displacement amount of said second piston is regulated by a projection of a cover member disposed on said valve mechanism section.

9. The two-way valve according to claim 1, wherein said pilot pressure supply section includes a first pilot pressure supply mechanism for pressing a first piston of a first displacement mechanism by supplying a pressure fluid to a first pilot chamber, and a second pilot pressure supply mechanism for pressing a second piston of a second displacement mechanism by supplying the pressure fluid to a second pilot chamber.

10. The two-way valve according to claim 1, further comprising a flow rate-adjusting mechanism for controlling said valve opening degree of said valve plug by adjusting a displacement amount of said valve plug.

11. The two-way valve according to claim 10, wherein said flow rate-adjusting mechanism adjusts a displacement amount of a piston of said displacement mechanism disposed on an end of said valve mechanism section, said valve mechanism section having said plurality of displacement mechanisms coaxially disposed therein.

12. The two-way valve according to claim 10, wherein said flow rate-adjusting mechanism includes an adjusting member having a screw section and a cup section which makes abutment against a piston to regulate a displacement amount of said piston, and a fixing member screwed on said screw section to fix said adjusting member at a predetermined position.

* * * * *